United States Patent [19]
Bullock

[11] Patent Number: 5,211,991
[45] Date of Patent: May 18, 1993

[54] METHOD OF PLASMA SPRAYING MAGNETIC-CERMET DIELECTRIC COATINGS

[75] Inventor: Ronald E. Bullock, Cardiff, Calif.

[73] Assignee: Hughes Aircraft Company, Los Angeles, Calif.

[21] Appl. No.: 917,880

[22] Filed: Jul. 23, 1992

[51] Int. Cl.$^5$ .............................................. B05D 5/12
[52] U.S. Cl. .................................. 427/448; 427/123; 427/126.2; 427/129; 427/131; 427/261; 427/307; 427/402; 427/446; 427/452; 427/455; 427/456; 427/569; 427/574; 427/576; 427/578
[58] Field of Search ............. 427/448, 123, 126.2, 427/129, 131, 261, 307, 402, 446, 452, 455, 456, 569, 574, 576, 578

Primary Examiner—Bernard Pianalto
Attorney, Agent, or Firm—R. M. Heald; C. D. Brown; W. K. Denson Low

[57] ABSTRACT

A method of forming high temperature resistant coatings having magnetic particles in a ceramic matrix by plasma spraying. Typically, the surface to be coated is cleaned by a combination of solvent cleaning and abrasion, such as by grit blasting. A mixture of ceramic particles and metal particles is provided and the mixture is plasma sprayed onto the surface using a sufficiently large proportion of metal particles to form a conductive first coating layer. A second layer is plasma sprayed with a mixture having a gradually decreasing metal particle content. A third layer is plasma sprayed using a mixture having a sufficiently low proportion of metal particles as to be dielectric. A pattern of small, spaced, conductive areas is then formed on the surface of the third layer. The resulting coating is durable, high temperature resistant and absorbs incident microwave energy.

4 Claims, 1 Drawing Sheet

METHOD OF PLASMA SPRAYING MAGNETIC-CERMET DIELECTRIC COATINGS

BACKGROUND OF THE INVENTION

This invention relates in general to the formation of coatings by plasma spraying techniques, and, more particularly, to the production of magnetic-cement dielectric coatings by plasma spraying.

In the past, magnetic-cermet dielectric coatings have been formed by coating a mixture of metal particles and ceramic particles in a liquid carrier onto a substrate, evaporating the liquid and heating the assembly to the sintering temperature of the ceramic. A dielectric layer results, with the metal particles sufficiently separated (by spacing or by in-situ formation of insulating oxide layers) so that the coating has sufficiently low electrical conductivity.

While suitable for some applications, this process has a number of disadvantages and problems. Parts to be coated are limited in size to the sizes of sintering furnaces available. Since the sintering temperature is quite high, often over 800 degrees C., depending on the ceramic glass frit employed, substrates such as polymeric materials, or carbon-carbon composites that would be damaged at the sintering temperature in air cannot be used. Also, cooling from the sintering temperature may, where the coating and substrate have significant differences in coefficient of thermal expansion (CTE), cause cracking or delamination in the coating. Repairs of damaged areas are particularly difficult where the entire part must be exposed to the sintering conditions.

Attempts have been made to form magnetic-cermet dielectric coatings by plasma spraying, with little success since the coatings prepared are excessively conductive even with a metal content as small as about 10 vol %.

The ability to coat a variety of substrates of various sizes would expand the usefulness of magnetic-cermet dielectric coatings beyond the present microwave absorption uses. For example, microwave absorbing coatings on cookware and browning dishes for use in microwave ovens would benefit from the capability of induction heating at or near food surfaces. These coatings would have applications in induction heating coatings for industrial processes such as heat treatment of non-ferrous alloys. They also may find application in interference fit assembling, welding, brazing, etc. and in the production of magnetic coatings on non-ferrous alloy plates for computer memory disk drives. Because of their high temperature resistance, they will have applications as a microwave absorber for aircraft engine exhaust components and the like.

Thus, there is a continuing need for improved methods of forming magnetic-cermet dielectric coatings having improved durability, high temperature resistance and microwave absorption characteristics.

SUMMARY OF THE INVENTION

The above-noted problems, and others, are overcome in accordance with the method of this invention, wherein a multilayer coating of plasma sprayed ceramic and magnetic metal particles is applied on a cleaned substrate to form a magnetic-cermet dielectric coating of improved performance.

Any suitable cleaning method may be used. For best results, a solvent cleaning of the surface, followed by abrasion is preferred. For metal substrates, vapor degreasing followed by grit blasting of the surface, typically with 20 to 80 mesh alumina, and a final cleaning wash with a solvent that does not leave a residue, such as acetone, gives an optimum surface for applying the coating. With carbon-carbon substrates and many other non-metallic materials, only the solvent wash followed by drying is generally satisfactory, with light sanding with a medium grade sandpaper desirable where the surface is polished or very smooth.

A quantity of dielectric ceramic particles having average diameters in the range of from about 10 to 45 micrometers and a quantity of magnetic metal particles having average diameters in the same range are mixed in proportions of from about 50 to 60 vol % metal particles to about 50 to 40 vol % ceramic particles to form a first mixture. This mixture is plasma sprayed onto the substrate to a thickness of from about 3 to 5 mils to form a first layer.

A second layer is formed by spraying a mixture of the particles initially having the same composition as said first mixture onto the first layer and gradually reducing the metal loading to about 10 vol % metal particles as a layer having a thickness of about 3 to 5 mils is formed.

A third layer is formed by preparing a mixture of about 5 to 10 vol % metal particles and the balance ceramic particles and plasma spraying the mixture onto the second layer to form a third layer having a thickness of from about 30 to 50 mils. This coating is useful as a microwave absorbing layer.

For optimum results, a top coat having discrete spaced conductive areas is formed on said third layer from a conductive material. For best results, the top coat is formed by spraying a mixture of ceramic and metal particles, having a composition of the sort used for the first layer, onto the third layer through a stencil to a thickness of from about 1 to 3 mils. The stencil has openings having areas of from about 0.39 to 6.25 mm$^2$ with spaces having a width of from about 0.125 to 0.5 mm between openings. Typically, the stencil may be a fiberglass screen, having woven fiberglass strands having diameters of about 12 to 15 mils that define rectangular screen openings of about 45 by 60 mils. After spraying, the screen is peeled away leaving a highly accurate pattern consisting of small conductive rectangles separated on all sides by insulating gaps.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figure 1:
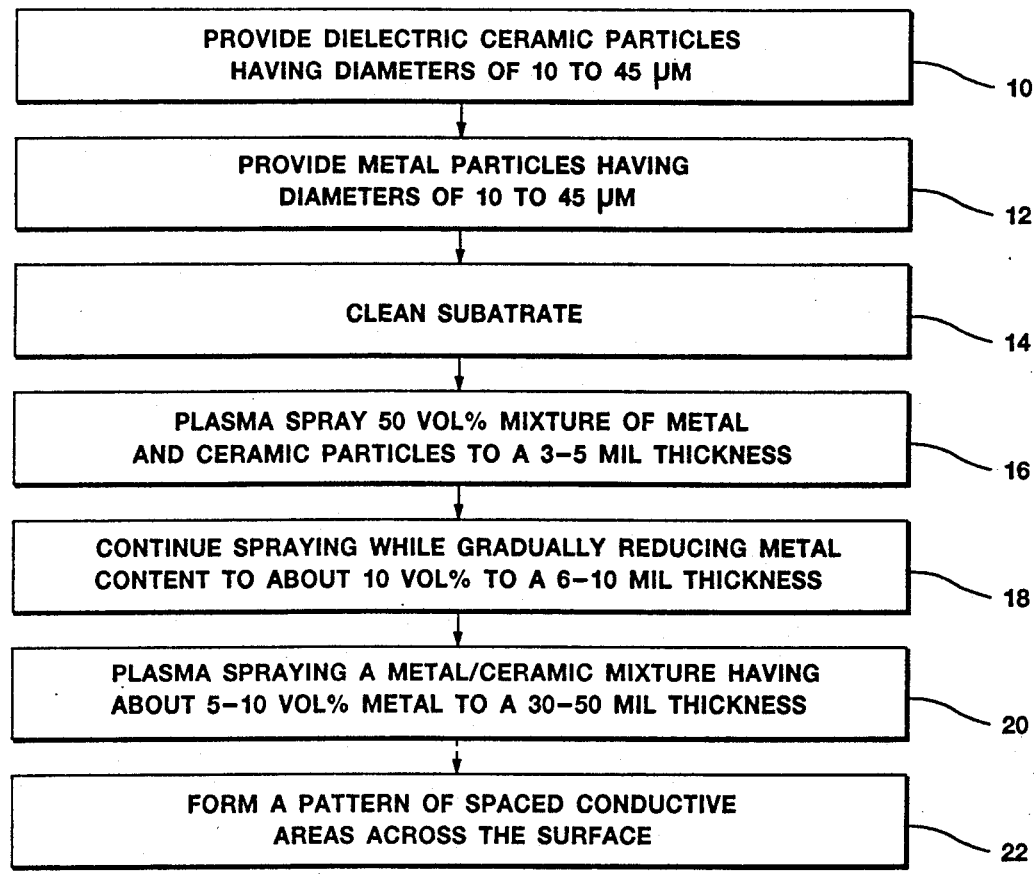
FIG. 1 is a block diagram outlining the steps of the method of this invention.

Referring now to FIG. 1, there is seen a block diagram illustrating the steps in a preferred embodiment of the method of this invention.

As indicated in block 10, a quantity of dielectric glass or ceramic particles (hereinafter generically referred to as "ceramic" particles) having average diameters of from about 10 to 45 micrometers is prepared. The particles may have any suitable shape, typically irregular shapes produced by fracturing a large mass of rounded droplet shapes produced by melting or sol-gel processes. Any suitable dielectric ceramic material may be used. Typical ceramics include silicon dioxide, barium dioxide, boron oxide, calcium oxide, strontium oxide, aluminum oxide and mixtures thereof. Of these a mixture of the oxides of silicon, barium and boron is preferred in suitable proportions that produce a sprayed glassy material that will soften at a convenient working temperature of about 1000° C., which is near the maximum to which conventional super-alloy substrates may be subjected.

As indicated in block 12, a quantity of magnetic metal particles having average diameters of from about 10 to 45 micrometers is provided. The metal particles may be prepared in any suitable manner and may having any suitable shape. Typically, the particles may be formed by grinding, in a shot tower, or the like. The metal particles may be formed from any suitable magnetic metal. Typical metals include iron, iron-aluminum, iron-silicon, cobalt and mixtures thereof.

The substrate to be coated is cleaned prior to coating, as indicated in block 14. Any suitable cleaning method may be used that produces a contaminate free surface. For best results, a solvent cleaning of the surface, followed by abrasion is preferred. For metal substrates, vapor degreasing followed by grit blasting of the surface, typically with 20 to 80 mesh alumina, and a final cleaning wash with a solvent that does not leave a residue, such as acetone, gives an optimum surface for applying the coating, or transition coating.

With smooth metal substrates that cannot be grit blasted and smooth, shiny carbon-carbon and organic resin matrix substrates, a uniform, fine abrasion of the substrate is preferred. For most metal substrates, grit blasting of the surface, typically with 20 to 80 mesh alumina is sufficient. With non-metallic substrates, such as organic resin matrix composites or carbon-carbon composites, only the solvent wash followed by drying is generally satisfactory, with light sanding with a medium grade sandpaper desirable where the surface is polished or very smooth.

Any suitable cleaning method may be used that produces a contaminate free surface. For best results, a solvent cleaning of the surface, followed by abrasion is preferred. For metal substrates, vapor degreasing followed by grit blasting of the surface, typically with 20 to 80 mesh alumina, and a final cleaning wash with a solvent that does not leave a residue, such as acetone, gives an optimum surface for applying the coating, or transition coating.

The composite particles are applied onto the substrate by plasma spraying, as indicated in Block 16 to form a first or transition layer. Any suitable, conventional, plasma spraying apparatus may be used to form the magnetic-cermet dielectric coatings of this invention. The mixture comprises from about 50 to 60 vol % metal particles, with the balance ceramic particles. The resulting first layer is electrically conductive and preferably has a thickness of from about 3 to 5 mils. For optimum results in most applications, the thickness will be about 5 mils.

Plasma spraying of this composition continues, as indicated in block 18, with the metal content being gradually reduced until the mixture only has from about 15 to 10 vol % metal particles, to form a second or transitional layer. Where the particles are mixed at the plasma spray gun, the mixture can easily be continuously changed to reduce the metal content. Alternatively, the mixture can be changed in steps by replacing the mixture at the gun with mixtures having an ever smaller proportion of metal particles. Either way, the layer becomes less conductive, until the final portion of the layer is dielectric. Typically, about 10% of the thickness is non-conductive.

Finally, a third layer or top coat is formed by plasma spraying a mixture comprising from about 5 to 10 vol % metal particles, the balance being ceramic particles, onto the second layer as indicated in block 20. This dielectric layer preferably has a thickness of from about 30 to 50 mils. In most applications, a layer having a thickness of about 45 mils is optimum.

For optimum performance, a pattern of small spaced conductive areas on the top coat is formed by plasma spraying, as indicated in block 22. While any suitable conductive material can be used, the mixture used to form the first layer is preferred for optimum compatibility with the coating. As discussed above, these areas each cover about 0.39 to 6.25 $mm^2$, with the areas spaced about 0.125 to 0.5 mm from each other.

Figure 2:
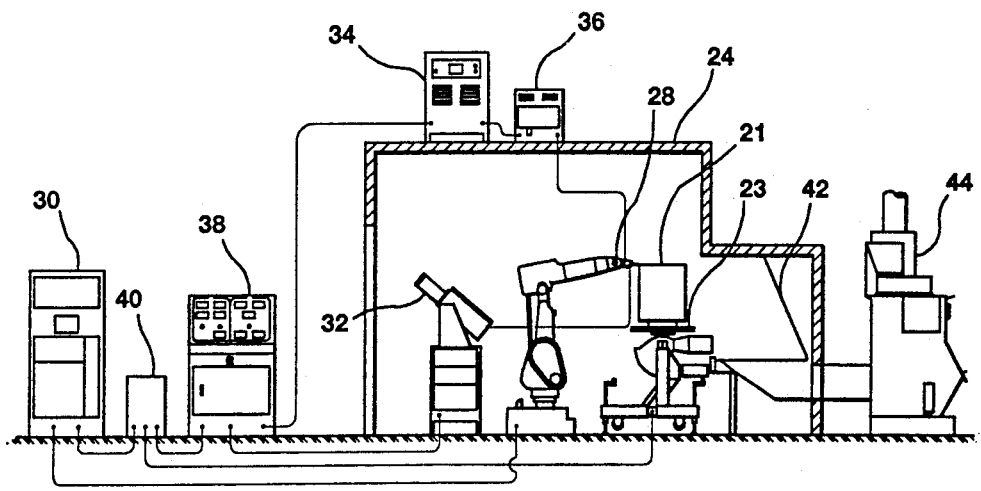
FIG. 2 is a schematic elevation view of apparatus for performing the method.

FIG. 2 provides a schematic elevation view of a preferred system for applying the magnetic-cermet dielectric coating. An object 21 is placed on a turntable 23 in an enclosure 24. A robotic arm 26 carries a plasma gun 28. Arm 26 and turntable 23 are controlled by conventional software at controller 30 to move plasma gun 28 over the surface to be coated in a prescribed pattern. Plasma gun 28 and powder feeder 32 are operated under control of a power supply 34, high frequency unit 36 and control console 38 which is connected to the robotic controller 30 through an interface unit 40. Any overspray from plasma gun 28 is caught in spray hood 42 and collected in dust collector 44.

Details of the invention, and of certain preferred embodiments, will be further understood upon reference to the following examples. All parts and percentages are by weight unless otherwise indicated.

EXAMPLE I

Blended spray particles for an initial bond layer are prepared by mixing about 50 vol % Fe-10Al metal particles in a size range of about 10 to 45 micrometers with about 50 vol % of a mixed oxide matrix in the same size range, where the mixed oxide matrix consists of about 45 vol % silicon dioxide, about 46 vol % barium oxide and about 9 vol % boron oxide.

A sheet of Inconel 625 alloy is degreased with 1,1,1-trichlorethane for about 5 min. One surface is then grit blasted with a mixture of 20 to 80 micrometer alumina particles for about 20 minutes to produce a uniformly abraded surface. The surface is washed with acetone to produce a clean, dust free surface.

A bond layer is then formed consisting of an about 50-50 vol % mixture of the separate, well-blended matrix and metal alloy particles described above by plasma spraying at a plasma temperature well above 2000° C. to produce a strong conductive layer having a thickness of about 5 mils. The particles are fully melted during the plasma spraying. An SG-100 plasma spray gun from Miller Thermal, Inc. is used.

Plasma spraying is continued, but the metal particles and ceramic particles are fed to the spray gun separately. As the sprayed layer builds up, the proportion of metal particles is gradually reduced from about 50 vol % to about 10 vol % over a thickness of about 5 mils. Spraying is continued with the 10 vol % metal, 90 vol % ceramic, mixture until a thickness of about 45 mils is reached.

This coating is found to have excellent dielectric properties, combined with a strong bond to the surface and excellent high temperature and erosion resistance.

EXAMPLE II

The experiment of Example I is repeated, but the final coating thickness is limited to about 30 mils thickness.

A pattern of thin conductive areas is formed over the dielectric layer. A screen having plural, regularly spaced rectangular openings having dimensions of about 45 by 60 mils, is placed over the dielectric layer. The screen distance between openings is about 12 to 15 mils. A conductive coating is plasma sprayed to a thickness of about 2 mils, forming a plurality of spaced conductive rectangles. The conductive coating may be formed from the bond layer material described above.

The multi-layer dielectric coating thus produced is found to have characteristics generally similar to that produced in Example I, but to be thinner and thus lighter in weight and to have a generally desired higher surface thermal emissivity.

While certain specific materials, conditions and parameters were detailed in the above description of preferred embodiments, those may be varied, where suitable, with similar results. Other applications and ramifications of this invention will occur to those skilled in the art upon reading this disclosure. Those are intended to be included within the scope of this invention, as defined in the appended claims.

I claim:

1. The method of forming a magnetic-cermet dielectric coating on a substrate surface which comprises the steps of:

providing a quantity of finely divided electrically insulating ceramic particles having average diameters of from about 10 to 45 micrometers and a quantity of finely divided magnetic metal particles having average diameters of from about 10 to 45 micrometers;

mixing together portions of said ceramic and said metal particles to produce a first mixture having about 50 vol % of each type of particles;

plasma spraying said first mixture onto a substrate to form a first layer having a thickness of from about 3 to 5 mils;

continuing to plasma spray said first mixture onto said first layer while gradually reducing the metal content to about 10 vol %, to form a transitional layer having a total thickness of from about 6 to 10 mils;

mixing additional quantities of said metal and ceramic particles to a substantially uniform second mixture having about 5 to 10 vol % of metal particles, the balance being ceramic particles;

plasma spraying said second mixture onto said transitional layer to form a top layer having a thickness of from about 30 to 50 mils.

2. The method according to claim 1 including the further step of plasma spraying an electrically conductive material in a pattern of small spaced areas over said top layer to a thickness of from about 1 to 3 mils.

3. The method according to claim 2 wherein said conductive material is said first mixture.

4. The method according to claim 1 further including the step of cleaning said substrate prior to plasma spraying said first layer.

* * * * *